United States Patent [19]

Matsuoka et al.

[11] Patent Number: 4,710,155
[45] Date of Patent: Dec. 1, 1987

[54] BELT

[75] Inventors: Hiroshi Matsuoka, Izumi; Susumu Onoe, Osaka, both of Japan

[73] Assignee: Bando Chemical Industries, Lt., Hyogo, Japan

[21] Appl. No.: 727,862

[22] Filed: Apr. 26, 1985

[30] Foreign Application Priority Data

Apr. 26, 1984 [JP] Japan ................... 59-85953

[51] Int. Cl.$^4$ .............................. F16G 5/06
[52] U.S. Cl. ................... 474/260; 474/262; 156/137
[58] Field of Search ............... 474/260–264, 474/271; 156/137–139, 142, 161; 525/444

[56] References Cited

U.S. PATENT DOCUMENTS

| | | | |
|---|---|---|---|
| 2,726,976 | 12/1955 | Waugh | 474/262 X |
| 3,051,212 | 8/1962 | Daniels | 474/263 X |
| 3,433,770 | 3/1969 | Takeo Shima et al. | 525/437 X |
| 3,616,832 | 11/1971 | Takeo Shima et al. | 474/262 X |
| 3,900,680 | 8/1975 | Fix | 428/378 |
| 4,266,937 | 5/1981 | Takano | 474/260 X |
| 4,522,614 | 6/1985 | Matsuoka et al. | 474/260 |

FOREIGN PATENT DOCUMENTS

30844A1 1/1984 Fed. Rep. of Germany .
A917277 1/1963 United Kingdom .

Primary Examiner—Stephen J. Novosad
Assistant Examiner—Thuy M. Bui
Attorney, Agent, or Firm—Auslander & Thomas

[57] ABSTRACT

This belt is used as power transmission belt, timing belt and transportation belt. It has a tension section, a compression section and a load carrier layer disposed between said two sections. The load carrier of the load carrier layer is composed of polyethyleneterephthalate filament which has at least 85 mol % ethyleneterephthalate as repeated unit and is at least 0.8 in ultimate viscosity, less than 0.190 in bifringence rate, less than 60 in the degree of orientation of amorphous portion and less than 15 equivalent/$10^6$ g in terminal carboxyl group content, and said load carrier, when heated for 30 minutes at 150° C. after an adhesive treatment and a heat treatment, is less than 5% in shrinkage percentage at dry heating and at least 6 g/denier in strength and less than 4% in elongation at a load of 2 g/denier.

7 Claims, 3 Drawing Figures

BELT

BACKGROUND OF THE INVENTION

Field of the invention:

This invention relates to belts which show high resistance to flex fatigue and have good length stability.

Prior art

In general, in the field of power transmission belt cords made of polyethleneterephthalate fiber are used widely as load carriers because such cords are high in modulus of elasticity and low in contractility and show high resistance to flex fatigue.

The recent tendency is that power transmission belts are used under severe conditions and those having higher resistance to flex fatigue have been demanded. For example, in the field of motor cars, from the energy saving point of view lightening of weight and space saving of motor cars are in progress. For this purpose, the diameter of pulley to drive the power transmission belt which is the means of transmitting power from a driving shaft to an accessory drive of engine tends to be smaller so as to make the weight of an engine lighter. This tendency, however, involves higher flexing rates of belt and more fatigue of load carriers.

In the case where power is transmitted to a plurality of accessory drives, it was usual to provide a transmission belt for each accessory drive but the recent practice is to adopt the so-called multispindle transmitting system (to drive a plurality of accessory drives by a single belt) for space saving. Here, too, the diameter of pulley has been made smaller and this has brought more flex fatigue of load carriers of belt and earlier breakage of belt.

In order to improve the resistance to flex fatigue of power transmission belt having cords of polyethyleneterephthalate fiber as load carriers, various measures have been taken, such as (1) to increase the number of twist of a cord (Rubber Chemistry and Technology, 42 (1) 159, 1969), (2) to make the diameter of a cord smaller, (3) to make the ultimate viscosity larger (Japanese Patent Application Laying Open Gazette No. 57-201703), and so forth.

However, it is true that the measure (1) above improves resistance to flex fatigue but the modulus of elasticity of belt becomes low, the creep rate shows an increase and the residual elongation becomes larger. These drawbacks involve elongation of belt during use with resultant slip of belt and reduction of transmission ability. The measure (2) also improves resistance to flex fatigue but the required strength cannot be obtained in some cases. The measure (3) improves the resistance to flex fatigue to some extent but impairs the length stability of belt due to high percentage of shrinkage at dry heating. In this connection, polyethyleneterephathalate fiber which possesses high ultimate viscosity and shows a small percentage of shrinkage at dry heating is well known but load carriers made of such fiber are low in modulus of elasticity and show more slip.

As stated above, the conventional power transmission belt uses cords of polyethyleneterephthalate fiber as load carriers but such power transmission belt shows poor resistance to flex fatigue in use under severe conditions in recent years, especially under the present trend of smaller diameter of power transmission belt and under the existence of external force to curve the power transmission belt in the direction contrary to the direction in which the pulley is curved (hereinafter referred to as "reverse bend"), and therefore it is damaged and breaks in a short period time.

SUMMARY OF THE INVENTION

The present invention has been made to solve the problem mentioned above. A principal object of the present invention is to provide such belts which show an improved resistance to flex fatigue (especially in driving by a pulley of smaller diameter and in reverse bend) and have good length stability.

The belt according to the present invention comprises a tension section, a compression section and a load carrier layer disposed between the foregoing two sections. Load carriers of said layer are composed of polyethyleneterephthalate filament which has at least 85 mol % of ethyleneterephthalate as repeated unit and is at least 0.80 in ultimate viscosity, less than 0.190 in bifringence rate, less than 60 in the degree of orientation of amorphous portion and less than 15 equivalent/$10^6$ g in terminal carboxyl group content. Said load carriers are also less than 5% in shrinkage percentage at dry heating, at least 6 g/denier in strength and less than 4% in elongation at a load of 2 g/denier, when they were heated for 30 minutes at 150° C. after they were subjected to an adhesive treatment and a heat treatment. The above applies to the case where load carriers are a single cord and where load carriers are a part of woven fabric.

In the present invention, polyethyleneterephthalate filament which constitutes load carriers is required to have at least 85 mol %, preferably at least 95 mol %, ethyleneterephthalate as repeated unit and to be at least 0.80, preferably at least 0.85, in ultimate viscosity. As copolymerized components which constitute polyethyleneterephthalate filament, we can enumerate polyethylene glycol, diethylene glycol, etc. of carbon number 1-10. As dicarbonic acid components, we can enumerate isophthalic acid, adipic acid, sebacic acid, etc. When load carriers composed of polyethyleneterephthalate fiber with less than 0.80 ultimate viscosity are used, belt will show poor resistance to flex fatigue and poor strength, though it has good length stability. Therefore, if such belt is driven by a pulley of small diameter, it will break within a short period of time.

If load carriers composed of polyethyleneterephthalate filament which is at least 0.190 in bifringence rate or at least 60 in the degree of orientation of amorphous portion, resistance to flex tatigue of belt is not improved and belt will break by driving for a short period of time. Thus, for obtaining the belt having improved resistance to flex fatigue, it is required that polyethyleneterephthalate filament which is material of load carriers must meet the specified conditions mentioned above in respect of the ultimate viscosity, bifringence rate and degree of orientation of amorphous portion.

Furthermore, in the present invention it is preferable that polyethyleneterephthalate filament is less than 15 equivalent/$10^6$ g in terminal carboxyl group content. If the terminal carboxyl group content exceeds 15 equivalent/$10^6$ g, at vulcanization in the belt manufacturing process the strength of cords reduces to a large extent due to water and consequently belt causes flex fatigue by driving for a short period of time and finally breaks.

In the present invention, load carriers composed of polyethyleneterephthalate filament having such properties as mentioned above are required to be less than 5% in shrinkage percentage at dry heating, at least 6 g/denier in strength and less than 4% in elongation at a load of 2 g/denier, when subjected to an adhesive treatment and to a heating and stretching treatment for 20 seconds–10 minutes, preferably for 1–6 minutes, at the temperature of 200°–270° C., preferably 220°–250° C., and at the tension of 0.15–1 g/denier.

The shrinkage percentage at dry heating means a shrinkage percentage shown when the above load carriers were heat-treated at 150° C. for 30 minutes. If this shrinkage percentage is more than 5%, it is impossible to obtain power transmission belts having good length stability. Belts obtained in this case cause shrinkage with the lapse of time, with the result that they cannot be stretched between the specified pulleys.

In cases where the belt runs under the condition of high load, tension at the tension side of belt becomes higher than in the case of conventional load condition. Therefore, if load carriers which carry the tension of belt are less than 6 g/denier in strength, strength as belt is unsatisfactory and breakage of belt at an earlier stage will take place. Therefore, such load carriers are not preferable from practical use point of view.

The percentage of slip at running of belt can be shown by the following formula.

$$SP = \frac{(T_1 - T_2)}{K} \times 100$$

Where
SP: Percentage of slip (%)
$T_1$: Tension at the tension side (Kg)
$T_2$: Tension at the slackening side (Kg)
K: Spring constant of belt As is obvious from the above formula, reduction of K value (spring constant) involves an increase in slip percentage, with the result of earlier wear of belt and an increase in calorific value of belt which mean a shorter life of belt. The less the elongation by load of belt, the more the spring constant K and therefore it is preferable that the former is small, for example, elongation of less than 4% at a load of 2 g/denier. If the elongation at a load of 2 g/denier is more than 4%, elongation of belt during running is large and belt will slip in running for a short period of time, with the result that belt is easy to be damaged.

In the present invention, in the case where load carriers are a cord, twist coefficient of the cord is set at 600–2,500, preferably 700–1,500. Twist coefficient of the cord is expressed by $T\sqrt{D}$, where T is the number of twist per 10 cm in each cord at first twist (when a plurality of filaments are twisted into yarn) and at final twist (when a plurality of such yarns are twisted into cord) and D is the number of indicated denier of cord. If this twist coefficient is less than 600, resistance to flex fatigue of belt is low. If this twist coefficient is more than 2,500, the cord is not suitable for use as load carriers because of high load elongation.

As stated above, in the belt according to the present invention, by specifying the physical property of polyethyleneterephthalate filament which is used for load carriers and by specifying physical property of load carriers after an adhesive treatment and a heat treatment, polyethyleneterephthalate filament which constitutes load carriers before and after vulcanization reduces its strength only very slightly and has high resistance to flex fatigue. Thus, friction transmission belt, timing belt, transportation belt, etc. which show high resistance to flex fatigue even if driven by pulleys of small diameter and even in reverse bend, can be obtained.

The afore-mentioned and other objects and novel features of the present invention will be understood more clearly from the following description and accompanying drawings.

BRIEF EXPLANATION OF THE DRAWINGS

The accompanying drawings show preferred embodiments of the present invention, in which.

DETAILED DESCRIPTION OF THE INVENTION

A description is made below about the embodiments of the present invention.

Using the cords which were made of polyethyleneterephthalate filament having properties shown in Table 1 and which have such properties as shown in Table 2 after an adhesive treatment and a heat treatment as load carriers, a V belt was manufactured in the following procedures.

TABLE 1

| Item | Unit | Example of the present invention 1 | 2 | 3 | 4 | 5 | Comparative example 1 | 2 | 3 | 4 | 5 | 6 | 7 |
|---|---|---|---|---|---|---|---|---|---|---|---|---|---|
| Physical property of material yarn | | | | | | | | | | | | | |
| Ultimate viscosity | | 0.86 | 0.86 | 0.86 | 0.96 | 0.82 | 0.86 | 0.86 | 0.72 | 0.92 | 0.86 | 0.73 | 0.91 |
| Degree of orientation of amorphous portion | | 53 | 55 | 60 | 58 | 58 | 63 | 56 | 67 | 65 | 56 | 65 | 66 |
| Bifringence rate | $\times 10^{-3}$ | 183 | 190 | 190 | 187 | 185 | 190 | 205 | 196 | 200 | 189 | 189 | 203 |
| Terminal carboxyl group | Equivalent/ $10^6$ g | 8 | 12 | 8 | 13 | 10 | 8 | 8 | 32 | 35 | 30 | 38 | 33 |

TABLE 2

| | Physical property after treatment | | | | | | | | | | | | |
|---|---|---|---|---|---|---|---|---|---|---|---|---|---|
| Strength | g/de | 7.1 | 7.2 | 7.3 | 7.8 | 6.8 | 7.3 | 7.3 | 6.5 | 8.5 | 7.2 | 6.7 | 8.1 |
| Elongation at a load of | % | 2.4 | 2.5 | 2.5 | 2.6 | 2.3 | 2.5 | 2.5 | 2.3 | 2.6 | 2.5 | 4.2 | 2.7 |

TABLE 2-continued

| | Physical property after treatment | | | | | | | | | | | | |
|---|---|---|---|---|---|---|---|---|---|---|---|---|---|
| 2g/denier Shrinkage percentage at dry heating | % | 3.1 | 3.1 | 3.2 | 3.4 | 2.7 | 3.7 | 3.5 | 3.0 | 6.0 | 3.0 | 2.5 | 5.1 |

Figure 1:
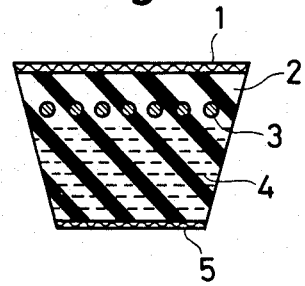
FIG. 1 is a cross sectional view of the V belt according to the present invention.

Firstly, raw cords of 3×5 composition were made of 1,000-denier polyethyleneterephthalate filament yarn at 1,000 twist coefficient both for first twist and final twist. Then, the raw cords were subjected to the conventional adhesive treatment, for example, the raw cords were soaked in a first bath containing an adhesive of epoxy system or isocyanate system and in a second bath comprising RFL for an adhesive treatment, after which they were heat-treated at 225°-250° C. for 10 seconds—several minutes under the tension of 0.15-1.0 g/denier. Thus, treated cords were obtained. Then, according to the conventional method a cogged V belt 6 (upper breadth 11.0 mm, height 11.0 mm and angle of 35°) of B type (JIS K6323), 1,016 mm in length, having an upper canvas 1, an extension rubber layer 2 comprising chloroprene rubber, a load carrier layer having the load carriers mentioned above as cords, a compression rubber layer 4 comprising chloroprene rubber reinforced with short fiber and a bottom canvas 5, as shown in FIG. 1, was manufactured and treated for running.

Figure 2:
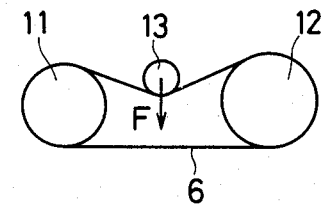
FIG. 2 is an explanatory drawing of a running tester.

As shown in FIG. 2, the above V belt 6 was stretched between the two pulleys 11 and 12, each having a diameter of 145 mm and 131 mm respectively. The pulley 11 was applied by a load of 3 horsepower and the number of revolutions of the pulley 12 was set at 1,800 r.p.m. By pressing an idle pulley 13 of 42 mm in diameter by a load of F=15 kg at the outer surface of the center of the belt, the V belt 6 was reverse bent at an angle of 120° and was run for 24 hours continuously. Then, cords 3 were taken out of the V belt 6 and the cord 3 at the central part was measured for strength. Another V belt 6 of the same composition was run for a long period of time and the running hours until the V belt 6 breaks were measured. Such running hours were regarded as the life of belt. The test results are shown in the following Table 3.

The V belt according to the present invention showed nothing abnormal after running for 2,000 hours. On the other hand, belts of comparative examples 1, 2 and 3 broke after running for short hours because of a high degree of orientation of amorphous portion in the case of comparative example 1, a high bifringence rate in the case of comparative example 2 and a low ultimate viscosity of polyethyleneterephthalate filament (material yarn of cord) in the case of comparative example 3. In the case of the belt of comparative example 4, strength after an adhesive treatment and a heat treatment and strength after running for 24 hours are high and therefore belt life is comparatively long but the belt is poor in length stability.

In the case of the belt of comparative example 5, because of large content of terminal carboxyl group the cord strength before running to the physical property after treatment showed reduction due to hydrolysis in the vulcanizing process, with resultant reduction of belt life to a large extent.

Figure 3:
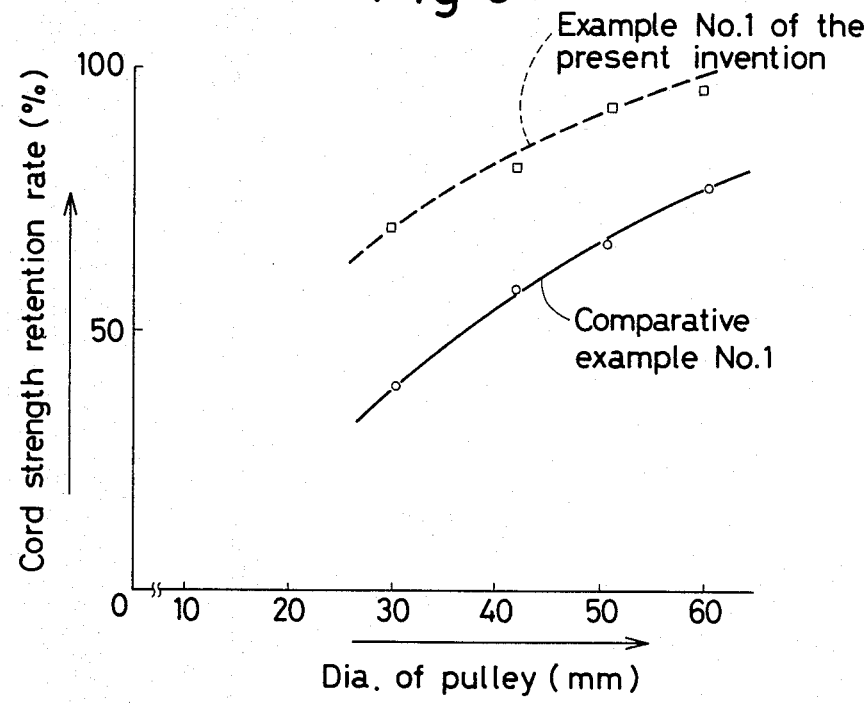
FIG. 3 is a graph showing the relation between the pulley diameter and the cord strength retention rate in respect of Example 1 of the V belt of the present invention and comparative Example 1 of the V belt.

Then, the V belt using treated cords obtained from the above example of the present invention as load carriers and the V belt using treated cords of the comparative example 1 as load carriers were tested for resistance to flex fatigue in varying diameters of pulley. More particularly, cord strength retention rates after running for 24 hours were measured in varying diameters (30 mm, 42 mm, 51 mm and 60 mm) of the idler pulley 13, using a running tester as shown roughly in FIG. 2. The result is as shown in FIG. 3, from which it can be seen that the V belt of example 1 of the present invention shows a higher cord strength retention rate than the V belt of comparative example 1, irrespective of the diameter of the idler pulley.

The testing methods employed in the above test are as shown below.

(i) Ultimate viscosity ($\eta$)

A solution of sample (8 grams of sample filament dissolved in orthochlorophenol 100 ml) was measured at 25° C. for relative viscosity $\eta r$, using a Ostwald type viscometer and $\eta$ was obtained from the following formulae.

$$[\eta] = 0.0242 \eta r + 0.2634$$

$$\eta r = (t + d)/(t_o + d_o)$$

Where

TABLE 3

| Item | Unit | Example of the present invention | | | | | Comparative example | | | | | | |
|---|---|---|---|---|---|---|---|---|---|---|---|---|---|
| | | 1 | 2 | 3 | 4 | 5 | 1 | 2 | 3 | 4 | 5 | 6 | 7 |
| Valuation of belt | | | | | | | | | | | | | |
| Strength of cord before running | g/de. | 7.1 | 7.1 | 7.3 | 7.6 | 6.7 | 7.2 | 7.2 | 5.9 | 7.7 | 6.4 | 6.1 | 7.3 |
| Strength of cord after running for 24 hours | g/de. | 5.9 | 5.8 | 5.8 | 6.4 | 5.1 | 4.4 | 4.3 | 2.8 | 5.0 | 4.5 | 2.8 | 4.7 |
| Belt life | hours | over 2000 | Over 2000 | Over 2000 | Over 2000 | Over 2000 | 930 | 800 | 210 | 1820 | 1000 | 80 | 1680 |
| Length stability | % | 0.2 | 0.2 | 0.2 | 0.3 | 0.1 | 0.4 | 0.4 | 0.2 | 1.2 | 0.2 | 0.2 | 1.1 | t and $t_o$ are the time required for flowing down and, d and $d_o$ are density of the solution of sample and that of orthochlorophenol, at 25° C.

(ii) Bifringence rate $\Delta\eta$

Using a Na light source, a Berek compensator was inserted in the optical-path of a polarization microscope and retardation was measured in α-naphthalene bromide. The bifringence rate was obtained from the following formula.

$$\Delta\eta = (N\lambda + R)/D$$

Where

N: is the number of interference band
λ: is the length of optical-path of Na
D: is the diameter of filament
R: is the retardation of compensator (iii) Degree of orientation of amorphous portion $\overline{F}$ A sample filament was soaked in 0.2 weight % aqueous solution of fluorescent agent (Mikephor ETN) for three hours at 55° C. After satisfactory rinsing, the sample filament was air-dried. Then, the sample filament was measured for the relative strength of polarizing fluorescence at 365 μm excitation wave length and 420 μm fluorescence wave length, by using a polarimeter (FOM-1 type manufactured by Nihon Bunko Kogyo K.K.). F was obtained from the following formula.

$$\overline{F} = (1 - B/A) \times 100$$

Where
A: is the relative strength of polarizing fluorescence in fiber axial direction.
B: is the above relative strength in the direction at a right angle to the fiber axial direction.

(iv) Terminal carboxyl group content 0.1 g of sample filament was weighed accurately. The sample was dissolved in a test tube containing 5 ml benzyl alcohol by heating for 3 minutes at 215° C. Then, the solution was cooled abruptly to 20°-30° C. in several seconds and was put in 10 ml chloroform. The test tube was rinsed with 5 ml heated benzyl alcohol, which was added to the above chloroform. This chloroform solution was titrated with 0.1N caustic soda benzyl alcohol solution, using phenol red 0.1% alcohol solution as an indicator, and the quantity of terminal carboxyl group was measured.

(v) Test of strength and elongation at a load of 2 g/denier

According to JIS L-1017 Method, a sample cord was wound in hank form. After the sample cord was left for 24 hours under the atmospheric condition of 25° C. and 65% RH, the sample (25 cm in length) was tested for tensile strength at the stretching speed of 30 cm/minute by Instron 1122 type tensile strength tester (made by Instron Engineering Corporation). The elongation is the elongation at a load of 2 g/denier.

(vi) Shrinkage percentage at dry heating

A sample was wound in hank form. After the sample was left for 24 hours in a temperature controlled room at 20° C. and 65% RH, a load which is equivalent to 0.5 g/denier of sample cord was added and the length of sample $I_o$ at that time was measured. Then, after the sample cord was left for 30 minutes in a heated furnace at 150° C. in tensionless state, it was left in the above temperature controlled room for 4 hours and again the above load was added and the length of sample I was measured. The shrinkage percentage was obtained from the following formula.

$$\text{Shrinkage percentage}(\%) = (I_o - I/I_o) \times 100$$

(vii) Length stability of belt ΔS

After the belt was left for 100 hours under the atmospheric condition of 25° C. and 65% RH, length variation of its inner circumference (shrinkage percentage) was measured. Length stability was obtained from the following formula, where $L_o$ is the distance between axes after 24 hours and L is that after 1,000 hours.

$$\Delta S = \{(L_o - L)/L_o\} \times 100$$

The above-mentioned example is the example applied to the low edge type V belt but can be applied to a wrapped V belt (outer circumferential surface of the belt load carrier is covered with woven fabric) and also to all kinds of power transmission belt and transportation belt, such as ribbed V belt, variable speed belt, flat belt, cogged belt, etc.

As the present invention can be embodied in various types without departing from its substantial characteristics, the above embodiments have been given solely for explanation purposes and are not of restrictive nature. Furthermore, as the scope of the present invention is not limited by the description made preceding the claim but is limited by the scope of claim for patent, any change in the requirements of the scope of claim for patent and equivalents to such requirements are included in the scope of claim for patent.

What is claimed is:

1. A transmission-type belt characterized in its ability to resist flexure, comprising a tension section, a compression section and load carriers disposed between said two sections composed of polyethyleneterephthalate filament of which at least 85 mol % ethyleneterephthalate is a repeated unit, said filament being at least 0.8 in ultimate viscosity, less than 0.190 in bifringence rate, less than 60 in the degree of orientation of its amorphous portion and less than 15 equivalent/$10^6$ g in terminal carboxyl group content.

2. The transmission-type belt of claim 1, wherein said load carriers are less than 5% in shrinkage percentage, at least 6 g/denier in strength and less than 4% in elongation at a load of 2 g/denier.

3. The transmission-type belt of claim 1, wherein said load carriers are spaced-apart cords.

4. The transmission-type belt of claim 1, wherein said transmission-type belt has a V-belt configuration.

5. The transmission-type belt of claim 1, wherein said tension and compression sections are part of an integral chloroprene rubber matrix.

6. A method of fabricating a transmission-type belt characterized in that it can resist flexure, comprising the steps of:
   (a) treating raw cords composed of polyethyleneterephthalate filament which has at least 85 mol % ethyleneterephthalate as repeated unit and is at least 0.8 in ultimate viscosity, less than 0.190 in bifringence rate, less than 60 in the degree of orientation of amorphous portion and less than 15 equivalent $10^6$ g in terminal carboxyl group content, said treatment including dry heat for 30 minutes at 150° C. after an adhesive treatment and a heat treatment whereby load carriers are fabricated having less than 5% in shrinkage percentage, at least 6 g/denier in strength and less than 4% in elongation at a load of 2 g/denier,
   (b) disposing between tension and compression sections of a rubber matrix, load carriers, and
   (c) vulcanizing said rubber matrix containing said load carriers.

7. The method of fabricating a transmission-type belt of claim 6, wherein said treating step (a) includes soaking said load carriers in at least one adhesive-containing bath and then heating said load carriers between approximately 225° and 250° C. for 10 seconds under a tension at between approximately 0.15-1.0 g/denier.

* * * * *